METHOD FOR MAKING FILM CAPACITORS

Filed Nov. 28, 1962

INVENTOR.
JEFFERSON N. CALLAHAN
BY
George C. Sullivan
Agent 3,262,867
Patented July 26, 1966

3,262,867

METHOD FOR MAKING FILM CAPACITORS

Jefferson N. Callahan, Los Angeles, Calif., assignor to Lockheed Aircraft Corporation, Burbank, Calif.

Filed Nov. 28, 1962, Ser. No. 240,661
10 Claims. (Cl. 204—38)

This invention relates generally to the making of film capacitors, and more particularly, to an improved method and bath for making film capacitors by means of anodizing techniques.

The operational complexities of present day electronics systems have caused substantial importance to be associated with the microminiaturization of the components used in connection with such systems. Considerable effort is being expended in an effort to provide higher quality and greater reliability in the miniaturized components, such as capacitors, used in such systems. Pursuant to such effort, particular attention has been given to thin film capacitors and other components utilized in such systems because of their inherent simplicity and compactness. However, the provision of high quality components, especially with regard to thin film capacitors for microminiaturization, has proven to be an extremely difficult problem, requiring relatively expensive and complicated methods and apparatus for producing the same. Thus far, however, prior art techniques are still not entirely satisfactory, particularly where higher dielectric constants and lower dissipation factors for producing the greater capacitance per unit volume and high voltage rated capacitors are required.

Accordingly, it is the broad object of the present invention to provide an improved method and bath for making high quality thin film capacitors.

A more specific object of this invention is to provide an improved method and bath for making high quality film capacitors by the use of an improved anodizing solution.

Another object of this invention is to provide an improved method and anodizing bath which is simple, relatively inexpensive, and forms dielectric films to produce improved capacitance and dissipation factor for capacitors.

A further object of this invention is to provide a new anodizing bath for titanium film capacitors which are capable of higher voltage ratings.

In accordance with an illustrative embodiment of the present invention, the foregoing objects may be achieved through the use of the method and bath in which a film capacitor is produced by anodizing a thin film of titanium coated on a suitable substrate in an improved anodizing bath to form a stoichiometric oxide film thereon which serves as the capacitor dielectric, while the unanodized portion of the titanium layer serves as one of the electrodes of the capacitor and a second conductive layer is formed on top of the stoichiometric oxide to serve as the other conductive electrode of the film capacitor. Advantageously, this method and anodizing bath provides an improved high quality film capacitor for microminiaturization usage with enhanced capacitance and dissipation factor characteristics and a higher voltage rating.

The novel features which are believed to be characteristic of the invention, both as to its organization and method of operation, together with further objects and advantages thereof, will be better understood from the following description considered in connection with the accompanying drawing, which is an illustrative embodiment of the invention disclosed by way of example. It is expressly understood, however, that the drawing is for purposes of illustration and description only and does not define limitations of the invention.

In the drawings.

Like numerals designate like elements throughout the figures of the drawing.

Figure 1:
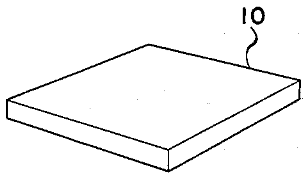
FIGURES 1 and 2 are perspective views illustrating initial steps in the fabrication of a thin film capacitor in accordance with an illustrative embodiment of the invention.

It is well known that anodizing involves the electrochemical modification of the surface of the metal by immersing a suitable metal in an anodizing bath, the metal serving as the anode of an electric circuit through which anodizing current is passed. The electrochemical modification of the metal surface resulting from an anodizing process ordinarily appears as an outside film or coating thereon. Anodizing has found its primary use in providing corrosive protection to the metal surface, or for electrolytically polishing or etching the surface thereof. A wide variety of process techniques and anodizing baths have been used in connection with such metals as aluminum, aluminum alloys, zinc, magnesium, and titanium. The anodizing baths used in this connection have wide variations in their composition and include such commonly known ingredients as chromic acid, sulphuric acid, boric acid, oxalic acid, orthophosphoric acid, ethylene glyco mono ethyl ester, alcohol, and water.

The use of anodizing for the purpose of making capacitors is not in itself new. However, using known anodizing baths has not heretofore produced dielectric surfaces having completely satisfactory properties for practical use in microminiaturization circuitry. For example, many known anodizing techniques for producing dielectric films may have relatively poor surface uniformity and adherence, high porosity, and relatively high loss characteristics. All of the characteristics tend to produce undesirable properties of one type or another in the resulting capacitors. In the commonly assigned copending patent application, Serial No. 55,089, now Pat. No. 3,085,052, entitled, "Method and Apparatus for Making Film Capacitors," by Merle E. Sibert, filed September 9, 1960, there is disclosed a method and associated anodizing bath which overcomes many of the shortcomings of heretofore known prior art anodizing techniques. The cited application discloses the method for anodization of titanium in an alkyl organic acid phosphate bath capable of producing a stoichiometric titanium dioxide surface film thereon, which is ideally suited to serve as a dielectric of a film capacitor. Nothwithstanding the fact that the Sibert invention was a significant improvement over the prior art for anodization of thin films, it has been discovered that certain further improvements therein may be achieved through the use of an anodizing bath in which the most active chemical substance is not solely an alkyl organic acid phosphate.

In accordance with the present invention, it has been discovered that the anodization of titanium in a bath comprising preselected proportions of ethyl acid phosphate, orthophosphoric acid, glycerol, and water, is capable of producing an improved stoichiometric titanium dioxide surface film thereon as a dielectric of a film capacitor which has a high dielectric constant and a lower dissipation factor than prior thin film capacitors. In addition, the capacitors produced according to the present invention have a higher breakdown voltage rating significantly greater than that produced by the aforesaid Sibert invention.

Figure 2:
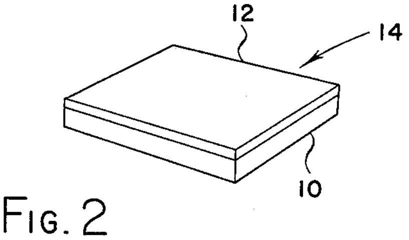

A full understanding of the invention may be had with reference to the drawing wherein FIGURES 1 through 5 provide illustrative description of a typical fabrication of film capacitors according to the invention. FIGURE 1 shows an alumina substrate 10 which is coated with a uniform layer of titanium 12 as shown in FIGURE 2, having a resistivity on the order of $10^9$ ohms per square centimeter. The titanium coating may be formed on the substrate by any suitable method, for example, such as that disclosed in the commonly assigned U.S. Patent No. 3,022,201, issued February 20, 1962, by Ross A. Quinn and Robert F. Karlak, entitled, "Method of Coating a Body With Titanium and Related Metals."

Figure 3:
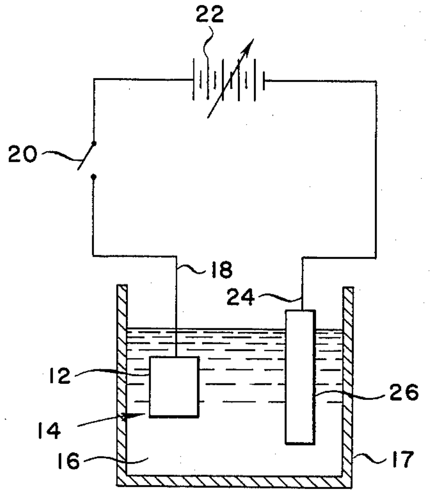
FIGURE 3 is a diagrammatic view of a titanium coated substrate being anodized in an improved organic anodizing bath to form a dielectric surface on the titanium in accordance with this illustrative embodiment of the invention.

The resulting coated substrate 14, shown in FIGURE 2, is first cleaned in a suitable solution, such as hydrogen fluoride, nitric acid and water, for example, and is then subjected to anodizing as diagrammatically illustrated in FIGURE 3. The substrate is immersed in an improved organic anodizing bath 16 in a suitable container 17 with an electrical lead 18 suitably connected to a layer 12 to support a substrate 14 in the bath 16 and to permit a titanium layer 12 to be connected through a power switch 20 to the positive side of an adjustable D.C. power supply represented by an adjustable battery 22. The negative side of the battery 22 is connected through an electrical lead 24 to a suitable conductive rod 26 inserted in the bath 16 and serving as a cathode.

Operation of the anodizing process will be given with reference to the illustrative arrangement shown in FIGURE 3 to produce the desired dielectric film on the titanium layer 12. It is expressly understood that the apparatus shown in FIGURE 3 is for illustrative purposes only and is not to be considered as limiting the scope of the invention. For example, the anodizing process may be conducted by use of apparatus such as is disclosed in the commonly assigned copending patent application Serial Number 226,857, entitled "Surface Treating Apparatus," filed September 28, 1962, by David A. Vance. A forming voltage of about 250 volts D.C. is initially selected for the anodizing process at a current of about 10 milliamperes per square centimeter. At the conclusion of this step, which involves about 30 minutes, the leakage current thereof is less than 10 microamperes. On completion of the anodizing step, the substrate is sprayed with a stream of water and immersed immediately thereafter in ethanol for about 30 minutes to prevent further anodization. It should be noted at this point that, although water may be suitable for some applications, it has been discovered that the use of ethanol in the manner described hereinafter is preferable, since the use thereof tends to completely stop the anodizing process, whereas with the use of water, there is some delay in terminating the anodizing reaction and thereby an uncontrollable variable is created. Contrariwise, it has been found that the immersing of the anodized film in the ethanol within five seconds after termination of the anodizing process will enable one to obtain reproducible films of uniform dielectric constants, dissipation factor and other critical characteristics.

Figure 4:
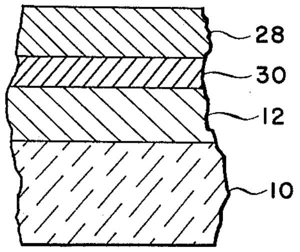
FIGURE 4 is a fragmentary cross-sectional end view of a film capacitor fabricated in accordance with the invention.
Figure 5:
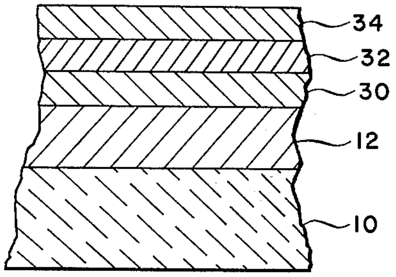
FIGURE 5 is a fragmentary cross-sectional end view of a film capacitor fabricated in accordance with an alternative embodiment of the invention.

Continuing with the description of the process, there is shown in FIGURE 4 a fragmentary cross-sectional end view showing the completed film capacitor, in which an outer conductive layer of copper 28 has been formed by vacuum evaporation on the anodized titanium dioxide film 30. Obviously, other metals beside copper could be used and other methods, as plating, sputtering, painting, and the like, could be used for deposition beside vacuum evaporation. For example, there is shown in FIGURE 5 another fragmentary cross-sectional end view of a film capacitor illustrating another embodiment in which the titanium dioxide film 30 is first coated with a graphite colloidal dispension 32, commonly known as "dag" dispension. The "dag" is then covered with a conductive layer, such as silver paint 34, for example, to complete the film capacitor.

The arrangement disclosed in FIGURE 5 has been found to be very advantageous, simple to produce, in that the step of applying the conductive layer is a manual operation, which is economical and readily reproducible. In addition, the use of these two substances, "dag" and silver paint, tend to further enhance the electrical properties of the capacitor, beyond that produced by the anodizing solution in accordance with the present invention.

More particularly, it has been found that the graphite in the "dag" wets the anodized surface substantially more uniformly than the metals utilized with vapor deposition techniques. Thus, the capacitance of the device is significantly increased due to the increased surface area contact between the carbon particles and the titanium dioxide film. The ability of the carbon to accomplish this feature may be explained by the fact that the carbon has much smaller particles than the silver paint and is therefore better able to cover the anodized surface more effectively.

It should be noted at this point that the present invention is substantially dependent upon the composition of the anodizing solution for its success, and the treatment of the titanium film therewith. The essential ingredients of the anodizing bath may be varied within preselected limits in proportions by volume, such as 5% to 25% ethyl acid phosphate, 2% to 15% orthophosphoric acid, 5% to 50% glycerol, and 20% to 80% water. However, it has been found that a solution comprising by volume the 10% ethyl phosphate to 5% by volume of 85% orthophosphoric acid, 20% glycerol, and 65% water, is preferred and provides an anodizing bath for producing unusually high quality dielectric films on a titanium surface.

The film capacitors produced by the preferred bath described above have provided capacitors having higher capacitances on the order of .1 microfarad per square centimeter, improved dissipation factors on the order of .01 for increased capacitor efficiency and higher breakdown voltages of at least 100 volts for higher capacitor voltage ratings. It should be noted that the most notable feature of capacitors produced with the foregoing solution is the higher breakdown voltage on the order of one-half the forming voltage, which permits the capacitor to be rated at significantly higher voltages than heretofore possible in the prior art and is capable of withstanding catastrophic voltage breakdowns experienced with prior art devices produced with prior art solutions, or the solution that is described in the copending Sibert patent application cited heerinabove. In addition to the foregoing advantage, it has been found that the present solution permits capacitors to be uniformly reproduced by personnel which have no special skill for making thin film capacitors.

It is to be understood that the above-described embodiments are only illustrative of the principles applicable in the invention. Numerous other modifications may be defined by those skilled in the art without departing from the spirit and scope of the invention. Thus, by way of example and not limitation, the variable D.C. supply 22 may be replaced by a more elaborate power supply having associated therewith measuring accessories such as a resistance bridge, regulated variable voltage, impedance bridge, and the like, in order to more accurately control the anodization process and to measure certain parameters of capacitors being produced. It should be noted at this point, however, that such a modification would only tend to permit the process to be more accurately controlled. Accordingly, it is to be understood that the present invention is limited only by the spirit and scope of the appended claims.

What is claimed is:

1. A method of making capacitors which comprises the steps of immersing an article having a thin film of titanium on at least one surface of said article in an organic anodizing bath, said bath comprising, by volume, 5% to 25% ethyl acid phosphate, 2% to 15% orthophosphoric acid, 5% to 50% glycerol and 20 to 80% water, anodizing said surface of said article in said bath by applying a direct current voltage between said suface and an associated conductor serving as a cathode of said anodizing step to form a first conductive electrode with a dielectric layer, and forming a second conductive layer on the exposed surface of said dielectric layer to complete the capacitor.

2. A method of making capacitors which comprises the steps of immersing an article having a titanium thin film surface in a solution consisting essentially by volume of 10% ethyl acid phosphate, 5% of an 85% orthophosphoric acid, 20% glycerol and 65% distilled water and anodically electrolyzing said surface by the application of a direct current voltage, of about 250 volts and 10 to 30 milliamperes per square centimeter to thereby produce a film of stoichiometric titanium dioxide as a dielectric layer on a first conductor, said dielectric layer exhibiting electrical properties of at least 0.01 microfarad per square centimeter, a dissipation factor of less than 1% and a voltage breakdown rating of at least 100 volts, and forming a second conductor over said dielectric layer to complete the capacitor.

3. An organic bath for anodizing a thin titanium film thereby to form a stoichiometric film of titanium dioxide on the surface of said titanium consisting essentially by volume of 5% to 25% ethyl acid phosphate, 2% to 15% orthophosphoric acid, 5% to 50% glycerol and the remainder water.

4. A bath for anodizing a thin titanium film to form a dielectric layer for capacitors in the form of a stoichiometric film of titanium dioxide on the surface of said titanium consisting essentially by volume of 10% ethyl acid phosphate, 5% of an 85% orthophosphoric acid, 20% glycerol and 65% distilled water.

5. An organic bath for anodizing a thin metal film from the group consisting of titanium, zirconium, hafnium, and uranium to thereby form a stoichiometric film of titanium dioxide on the surface of said metal film as a dielectric layer for capacitors consisting essentially by volume of a solution of 5% to 25% ethyl acid phosphate, 2% to 15% orthophosphoric acid, 5% to 50% glycerol and the remainder water.

6. A method of making capacitors which comprises the steps of immersing an article having a thin metal film from the group consisting of titanium, zirconium, hafnium, and uranium, on at least one surface of said article in an organic anodizing bath, said bath comprising, by volume, 5% to 25% ethyl acid phosphate, 2% to 15% orthophosphoric acid, 5% to 50% glycerol and the remainder water, anodizing said surface of said article in said bath to form a dielectric layer thereon and forming a conductive electrode on said dielectric layer.

7. A method of making capacitors which comprises the steps of immersing an article having titanium thin film surface in a solution consisting essentially by volume of 10% ethyl acid phosphate, 5% of an 85% orthophosphoric acid, 20% glycerol and 65% distilled water, anodically electrolyzing said surface by the application of a direct current voltage of about 250 volts and 10 to 30 milliamperes per square centimeter to thereby produce a dielectric film of stoichiometric titanium dioxide exhibiting electrical properties of at least 0.01 microfarad per square centimeter, a dissipation factor of less than one percent and a breakdown voltage of at least 100 volts, rinsing the anodized area with ethanol immediately after anodizing to prevent further anodization, and forming an outer conductive layer on the anodized surface of titanium to complete the capacitor.

8. A method of making capacitors which comprises the steps of anodizing a surface of a titanium-coated article in an organic bath, said bath comprising, by volume, 5% to 25% ethyl acid phosphate, 2% to 15% orthophosphoric acid, 5% to 50% glycerol and 20% to 80% water, so as to form a stoichiometric titanium dioxide film on the titanium-coated article thereon, and a first electrical connection, and forming an outer conductive film on said stoichiometric titanium dioxide film for a second electrical connection of the capacitor.

9. A method of making capacitors which comprises the steps of immersing an article of titanium on at least one surface of said article in an organic bath, said bath comprising, by volume, 5% to 25% ethyl acid phosphate, 2% to 15% orthophosphoric acid, 5% to 50% glycerol and 20% to 80% water, anodizing said surface of said article in said bath by applying a direct current voltage between said surface and an associated conductor serving as a cathode of said anodizing step to form a first conductive electrode with a dielectric layer, and forming a second conductive layer on the exposed surface of said dielectric layer to complete the capacitor.

10. An organic bath for anodizing titanium to form a titanium dioxide coating on the surface thereof comprising, by volume, 5% to 25% ethyl acid phosphate, 2% to 15% orthophosphoric acid, 5% to 50% glycerol and the remainder water.

References Cited by the Examiner

UNITED STATES PATENTS

| | | | |
|---|---|---|---|
| 2,647,079 | 7/1953 | Burnham | 204—38 |
| 2,695,380 | 11/1954 | Mayer et al. | 204—38 |
| 2,874,102 | 2/1959 | Wainer | 204—56 |
| 2,930,951 | 3/1960 | Burger et al. | 204—38 |
| 3,079,536 | 2/1963 | McLean | 204—38 |
| 3,085,052 | 4/1963 | Sibert | 204—38 |

OTHER REFERENCES

Koehler: Electrochemistry, 2nd edition (1944), page 158.

JOHN H. MACK, *Primary Examiner.*

MURRAY TILLMAN, *Examiner.*

L. G. WISE, W. VANSISE, *Assistant Examiners.*